US012398664B2

(12) United States Patent
Inoue et al.

(10) Patent No.: US 12,398,664 B2
(45) Date of Patent: Aug. 26, 2025

(54) EXHAUST PURIFICATION APPARATUS

(71) Applicant: YANMAR HOLDINGS CO., LTD., Osaka (JP)

(72) Inventors: Tsuyoshi Inoue, Osaka (JP); Daisuke Morimitsu, Osaka (JP); Takaki Sakamoto, Osaka (JP); Kohei Iwamoto, Osaka (JP); Yohei Kamata, Osaka (JP); Keita Fujisaki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/929,734

(22) Filed: Oct. 29, 2024

(65) Prior Publication Data

US 2025/0163838 A1    May 22, 2025

(30) Foreign Application Priority Data

Nov. 17, 2023   (JP) ................. 2023-195630

(51) Int. Cl.
  *F01N 3/08*    (2006.01)
  *B01D 53/94*   (2006.01)
  *F01N 3/20*    (2006.01)

(52) U.S. Cl.
  CPC ....... *F01N 3/0842* (2013.01); *B01D 53/9431* (2013.01); *F01N 3/2066* (2013.01); *B01D 2251/2067* (2013.01); *B01D 2257/404* (2013.01); *B01D 2258/01* (2013.01); *F01N 2610/1453* (2013.01)

(58) Field of Classification Search
  CPC ................. F01N 3/0842; F01N 3/2066; F01N 2610/1453; B01D 53/9431; B01D 2251/2067; B01D 2257/404; B01D 2258/01
  See application file for complete search history.

(56) References Cited

U.S. PATENT DOCUMENTS

| 3,209,531 | A | * | 10/1965 | Morris | ................. | F01N 3/26 |
| | | | | | | 60/288 |
| 5,992,141 | A | * | 11/1999 | Berriman | ........... | F01N 3/36 |
| | | | | | | 60/275 |
| 6,742,332 | B2 | * | 6/2004 | Piekarski | ............. | F01N 13/08 |
| | | | | | | 60/323 |
| 8,646,258 | B2 | * | 2/2014 | Vanvolsem | ........ | B01F 25/25 |
| | | | | | | 60/303 |

(Continued)

FOREIGN PATENT DOCUMENTS

| JP | 2009036041 A | * | 2/2009 | ............ B60K 13/04 |
| JP | 2014-234793 A | | 12/2014 | |

*Primary Examiner* — Jesse S Bogue
(74) *Attorney, Agent, or Firm* — Future IP LLC; Tomoko Nakajima

(57) ABSTRACT

An exhaust purification apparatus capable of improving stirring property of urea water and properly cooling an injection device is provided. The exhaust purification apparatus that purifies nitrogen oxides in exhaust gas includes an exhaust pipe that causes exhaust gas discharged from an engine to flow, a catalyst reactor (catalyst) provided in the exhaust pipe to reduce the nitrogen oxides in the exhaust gas, a through pipe provided in such a way as to penetrate the exhaust pipe, and an injection device provided inside the through pipe to inject a reducing agent for reducing exhaust gas into the exhaust pipe.

9 Claims, 6 Drawing Sheets

(56) References Cited

U.S. PATENT DOCUMENTS

| | | | |
|---|---|---|---|
| 9,482,132 B2 * | 11/2016 | Munnannur | F01N 3/2066 |
| 9,617,894 B2 * | 4/2017 | Tongu | F01N 13/009 |
| 9,932,875 B2 * | 4/2018 | Zhang | F01N 3/2066 |
| 9,957,868 B2 * | 5/2018 | Johnson | F01N 3/28 |
| 10,273,854 B1 * | 4/2019 | Abbassi | B01F 25/31331 |
| 10,865,744 B2 * | 12/2020 | Zhang | F02M 26/19 |
| 11,473,473 B2 * | 10/2022 | Khibit | B01F 23/2132 |
| 11,691,120 B1 * | 7/2023 | Sperry | F01N 3/2892 |
| | | | 422/176 |
| 2006/0233689 A1 * | 10/2006 | Hirata | B01F 25/31331 |
| | | | 423/235 |
| 2008/0216470 A1 * | 9/2008 | Sedlacek | F01N 13/08 |
| | | | 60/324 |
| 2009/0101123 A1 * | 4/2009 | Brogdon | B01F 23/10 |
| | | | 60/605.2 |
| 2013/0213013 A1 * | 8/2013 | Mitchell | F01N 3/2066 |
| | | | 73/23.31 |
| 2015/0020484 A1 * | 1/2015 | Kimura | F01N 3/2066 |
| | | | 55/459.1 |

\* cited by examiner

EXHAUST PURIFICATION APPARATUS

This application claims priority under 35 U.S.C. § 119 to Japanese Patent Application No. 2023-195630, filed on Nov. 17, 2023, which is incorporated by reference.

TECHNICAL FIELD

The present invention relates to an exhaust purification apparatus that purifies nitrogen oxides in exhaust gas.

BACKGROUND ART

Conventionally, an exhaust purification apparatus purifies exhaust gas discharged from an engine by reducing nitrogen oxides contained in the exhaust gas, and is constituted by a so-called SCR system. The exhaust purification apparatus is configured to reduce nitrogen oxides accumulated in a catalyst by providing the catalyst in an exhaust passage of the exhaust gas and supplying urea into the exhaust gas.

Further, for example, in an exhaust purification apparatus disclosed in Patent Document 1, a urea water injection nozzle is provided on a downstream side of an exhaust changeover valve in an exhaust pipe. A double pipe of the urea water injection nozzle is arranged in such a way that the downstream side is positioned inside the exhaust pipe and an upstream side is positioned outside the exhaust pipe, and an air nozzle of the urea water injection nozzle is arranged on a downstream side of a liquid nozzle in such a way that an upstream side end thereof abuts on a downstream side end part of the double pipe. Namely, the exhaust purification apparatus is provided with a urea water injection nozzle that protrudes from a wall of the exhaust pipe toward the central part.

PRIOR ART DOCUMENT

Patent Document

Patent Document 1: Japanese Unexamined Patent Publication No. 2014-234793

SUMMARY OF INVENTION

Technical Problem

In the exhaust purification apparatus, it is necessary to cool an injection device such as an injection valve or an injection nozzle for injecting urea water in order to suppress thermal damage to the urea water due to exposure of the injection device to the exhaust gas. In the urea water injection nozzle disclosed in Patent Document 1, a cooling method of cooling the nozzle by using air used for injection of the urea water is applied. However, the injection device may not be appropriately cooled depending on a configuration of the exhaust purification apparatus. For example, in an exhaust purification apparatus to which an airless injection device that does not use air for injection of urea water is applied, since the injection device cannot be cooled by air, an other cooling means needs to be provided. Note that, depending on the arrangement of the injection device or the arrangement of the cooling means in the exhaust pipe, there is a possibility that stirring property of the exhaust gas and the urea water may be reduced.

An object of the present invention is to provide an exhaust purification apparatus capable of improving the stirring property of urea water and appropriately cooling an injection device.

Solution to Problem

In order to solve the above-described problem, an exhaust purification apparatus according to an aspect of the present invention, which purifies nitrogen oxides in exhaust gas, includes: an exhaust pipe that causes the exhaust gas discharged from an engine to flow; a catalyst that is provided in the exhaust pipe and that reduces the nitrogen oxides in the exhaust gas; a through pipe that is provided in such a way as to penetrate the exhaust pipe; and an injection device that is provided inside the through pipe and that injects a reducing agent for reducing the exhaust gas into the exhaust pipe.

Advantageous Effects of Invention

The present invention provides an exhaust purification apparatus capable of improving the stirring property of urea water and appropriately cooling an injection device.

DESCRIPTION OF EMBODIMENTS

Figure 1:
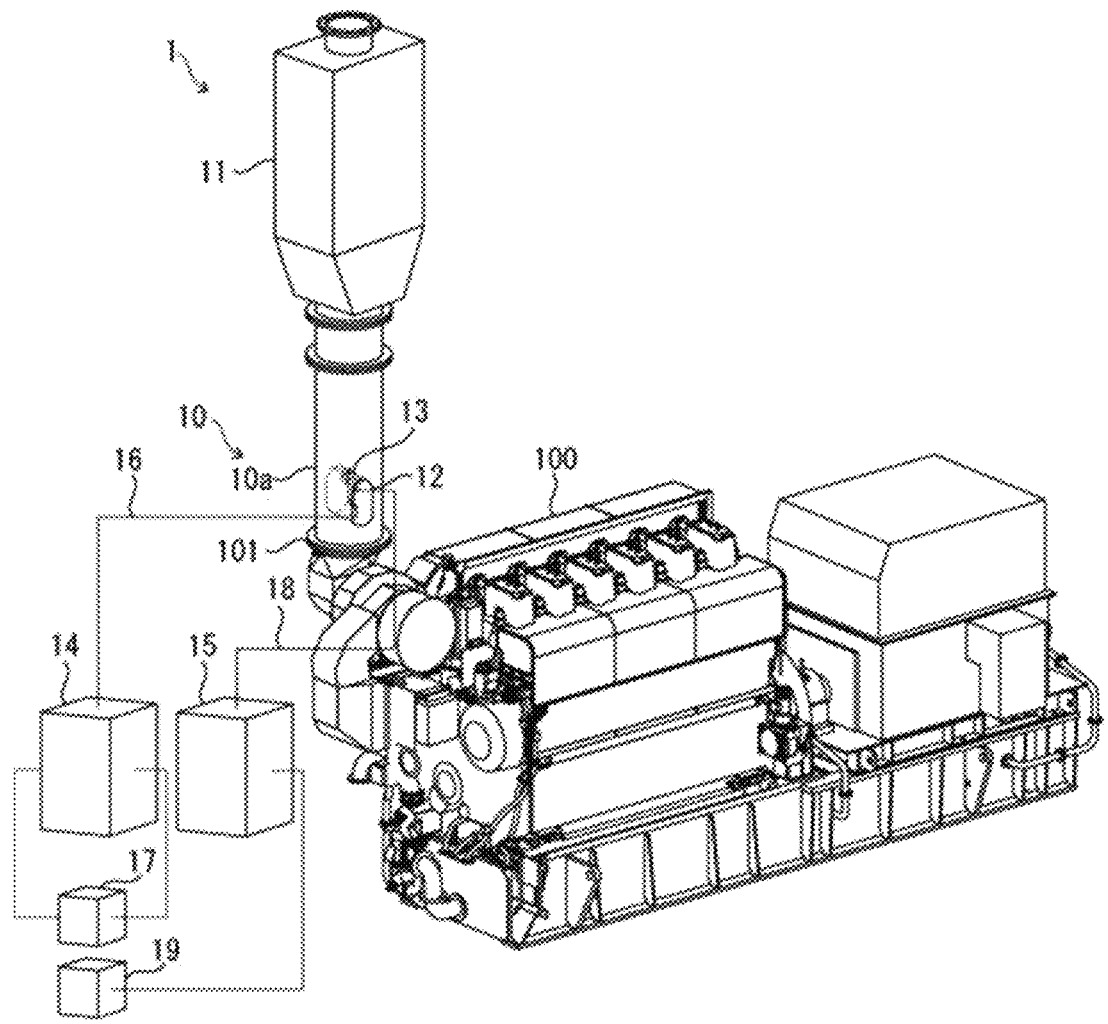
FIG. 1 is a schematic view illustrating an exhaust purification apparatus according to an embodiment of the present invention and an engine to which the exhaust purification apparatus is applied.
Figure 2:
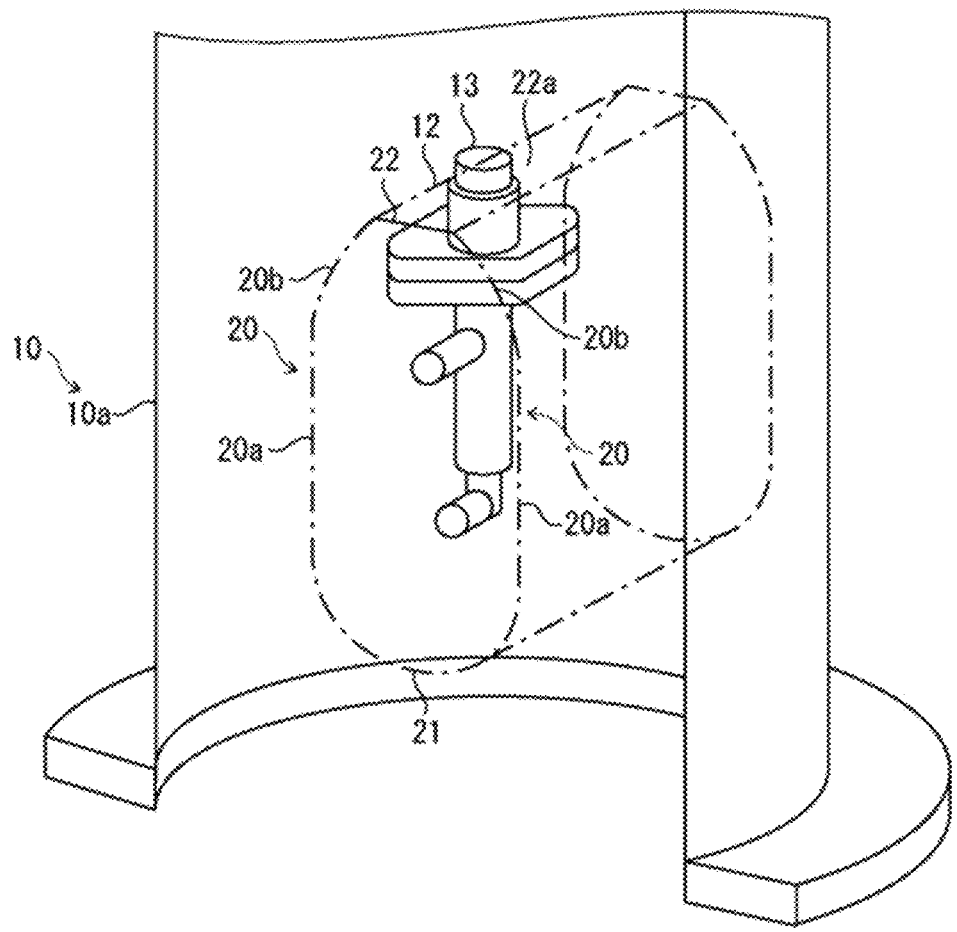
FIG. 2 is a perspective view illustrating an exhaust pipe and a through pipe in the exhaust purification apparatus according to the embodiment of the present invention.

An exhaust purification apparatus 1 according to an embodiment of the present invention will be described with reference to the drawings. As illustrated in FIG. 1, the exhaust purification apparatus 1 is applied to an engine 100 and purifies exhaust gas discharged from the engine 100. FIG. 1 illustrates an example in which the exhaust purification apparatus 1 is applied to the engine 100 that discharges exhaust gas in a vertical direction.

The engine 100 includes a plurality of cylinders each having a cylinder head or a cylinder block. The engine 100 includes an intake port (not illustrated) that takes in fuel gas, and an exhaust port 101 that discharges exhaust gas in a predetermined exhaust direction (for example, upward). An exhaust pipe 10 of the exhaust purification apparatus 1 is connected to the exhaust port 101, and the engine 100 discharges exhaust gas to the exhaust pipe 10 of the exhaust purification apparatus 1 via the exhaust port 101.

Figure 3:
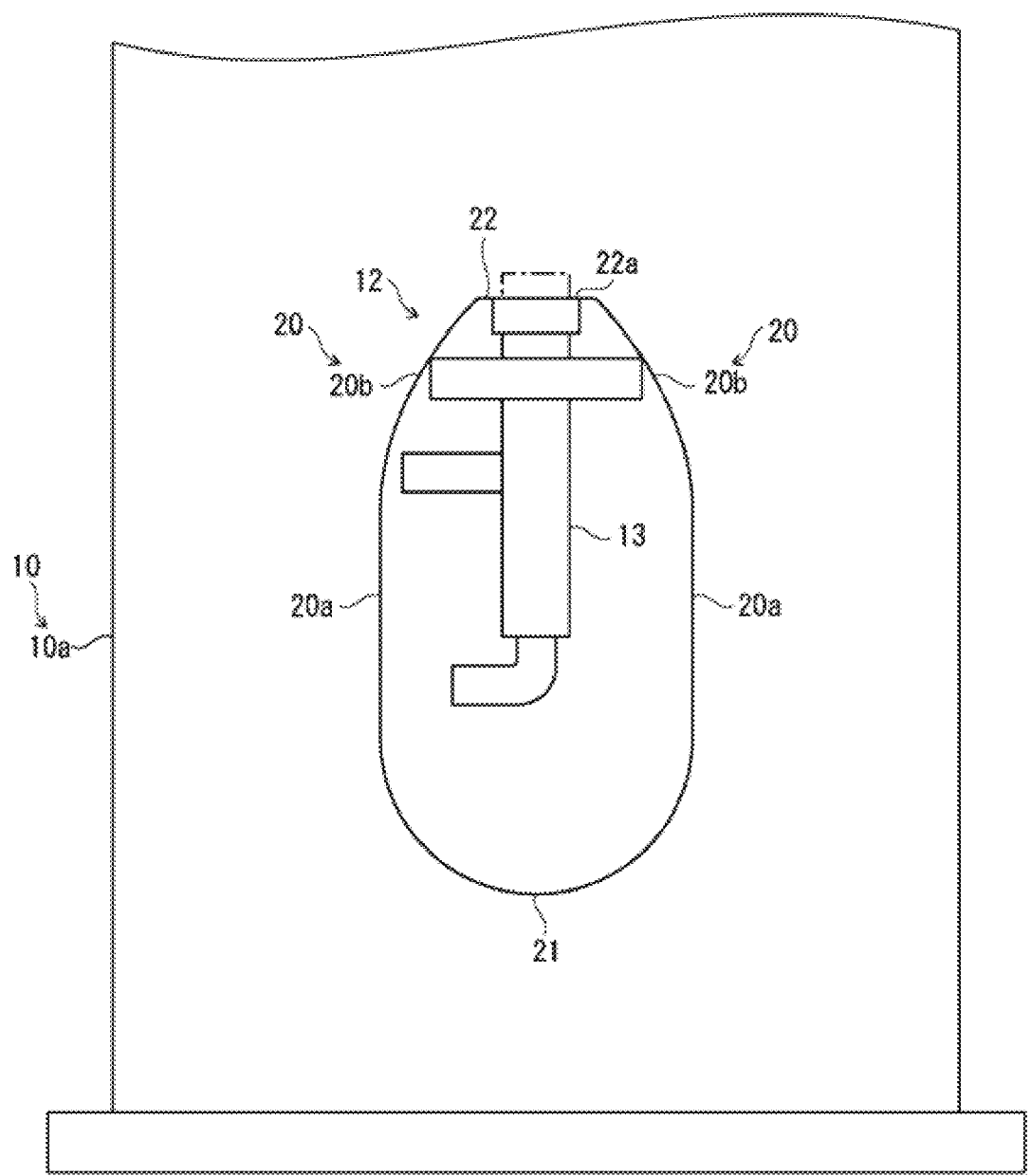
FIG. 3 is a front view illustrating an exhaust pipe and a through pipe in the exhaust purification apparatus according to the embodiment of the present invention.

The exhaust purification apparatus 1 is constituted by a so-called selective catalytic reduction (SCR) system that purifies exhaust gas by reducing nitrogen oxides (NOx) in the exhaust gas. For example, as illustrated in FIG. 3, the exhaust purification apparatus 1 includes an exhaust pipe 10, a catalyst reactor 11 (catalyst), a through pipe 12, an injection device 13, a reducing agent supply device 14, and a cooling medium supply device 15.

The main parts (the exhaust pipe 10, the catalyst reactor 11, the through pipe 12, and the injection device 13) of the exhaust purification apparatus 1 are provided with respect to the exhaust port 101 of the engine 100, and are arranged, for example, above the exhaust port 101. The reducing agent supply device 14 and the cooling medium supply device 15 may be provided separately from the main parts of the exhaust purification apparatus 1. The reducing agent supply device 14 and the cooling medium supply device 15 may be integrally configured as one unit as illustrated in FIG. 1, or may be configured as separate bodies.

The exhaust pipe 10 allows exhaust gas discharged from the engine 100 to flow in a predetermined exhaust direction (for example, upward). The exhaust pipe 10 is coupled to an upper side of the exhaust port 101 of the engine 100. The exhaust pipe 10 includes a straight pipe portion 10a formed in a linear shape.

The catalyst reactor 11 brings exhaust gas mixed with a reducing agent such as urea water into contact with a catalyst and promotes a reduction reaction in which nitrogen oxides contained in the exhaust gas are selectively reduced to nitrogen and water, thereby purifying the exhaust gas. The catalyst reactor 11 is provided with a catalyst such as a NOx reduction catalyst and is connected to the exhaust pipe 10 on the downstream side in the exhaust direction. The catalyst reactor 11 introduces exhaust gas mixed with a reducing agent injected from the injection device 13 and flowing through the exhaust pipe 10, and brings the exhaust gas into contact with the catalyst.

The through pipe 12 is provided in the exhaust pipe 10 on the upstream side of the catalyst reactor 11 (catalyst) in the exhaust direction in such a way as to pass through the center of the exhaust pipe 10 in the radial direction and penetrate the exhaust pipe 10 in the radial direction (direction orthogonal to the exhaust direction). The through pipe 12 may be provided on a straight pipe portion 10a formed in a linear shape in the exhaust pipe 10. The through pipe 12 is a cylindrical member of which both ends are opened, and the through pipe 12 is provided inside the exhaust pipe 10 by connecting the both ends of the through pipe 12 to openings provided on two opposing side surfaces of the exhaust pipe 10 by welding or the like. The exhaust gas flowing inside the exhaust pipe 10 flows on the outer peripheral surface side of the through pipe 12.

The through pipe 12 has a substantially elliptical cross-sectional shape which is long in the exhaust direction, is formed in such a way that the cross-sectional shape is line-symmetrical with respect to the long axis thereof, and has the cross-sectional shape uniformly in the through direction. The through pipe 12 is formed to have a streamlined side surface with no corners.

The through pipe 12 includes a pair of side wall portions 20 extending in the exhaust direction, an upstream side portion 21 provided over the pair of side wall portions 20 on the upstream side in the exhaust direction, and a downstream side portion 22 provided over the pair of side wall portions 20 on the downstream side in the exhaust direction, and has a substantially elliptical cross-sectional shape. The through pipe 12 is configured in such a way such that the downstream side portion 22 is positioned inside both ends of the upstream side portion 21 in the width direction orthogonal to the through direction and the long axis of the cross-sectional shape.

The upstream side portion 21 of the through pipe 12 is formed to have, for example, a semicircular or semielliptical arc-shaped cross section which is convex toward the upstream side in the exhaust direction, and causes the exhaust gas flowing from the upstream side to flow to the outer peripheral surface side of the pair of side wall portions 20.

The pair of side wall portions 20 of the through pipe 12 is formed to be curved in a streamlined shape in such a way that a width of the cross-sectional shape decreases toward the downstream side in the exhaust direction. For example, the pair of side wall portions 20 is formed to be curved with a curvature smaller than that of the upstream side portion 21. For example, the side wall portion 20 is formed to have a linear portion 20a extending continuously from an end part of the upstream side portion 21 in the exhaust direction and a curved portion 20b curved continuously from a downstream end part of the linear portion 20a to the center side in the width direction of the cross-sectional shape. The side wall portion 20 causes the exhaust gas flowing from the upstream side to flow along the outer peripheral surface, and creates a flow toward the center side in the width direction of the cross-sectional shape toward the downstream side.

The downstream side portion 22 of the through pipe 12 has a planar portion 22a orthogonal to the exhaust direction and is formed continuously from downstream end parts of the pair of side wall portions 20.

The through pipe 12 is formed by, for example, joining members having the same shape by welding or the like, and by providing a welding position in the upstream side portion 21 or the downstream side portion 22, it is possible to form a side surface having a streamlined shape with no corners, without providing a weld overlay portion on the side surface.

With the above-described configuration of the through pipe 12, the exhaust gas flowing on the outer peripheral surface side of the through pipe 12 is branched to both sides in the width direction by the upstream side portion 21, then flows toward the center side in the width direction without stagnation along the pair of side wall portions 20 having a streamlined shape toward the center side in the width direction, and merges on the downstream side of the downstream side portion 22 without forming a dead water region such as a vortex retention region. In other words, the through pipe 12 is formed to have the pair of side wall portions 20 having a streamlined shape in such a way as not to form a dead water region on the downstream side of the downstream side portion 22.

The injection device 13 is provided inside the through pipe 12 with only the tip having an ejection hole exposed to the inside of the exhaust pipe 10. For example, the injection device 13 is constituted by an injection nozzle, an injection valve, or the like. The injection device 13 is connected to the reducing agent supply device 14 and injects a reducing agent such as urea water for reducing exhaust gas supplied from the reducing agent supply device 14 into the exhaust pipe 10. Note that the injection device 13 may be arranged in such a way as to inject the reducing agent to a position where the exhaust gases merge on the downstream side of the downstream side portion 22 of the through pipe 12.

The reducing agent supply device 14 is connected to a control device (not illustrated), and injects the reducing agent through the injection device 13 in response to an instruction signal from the control device. The injection device 13 is cooled by a cooling medium such as air flowing inside the through pipe 12.

The injection device 13 is provided on the downstream side in the exhaust direction between the pair of side wall portions 20 inside the through pipe 12. For example, the injection device 13 is provided on a downstream side portion 22 of the through pipe 12, to be specific, on a planar portion 22a of the through pipe 12. The injection device 13 is provided in such a way as to inject the reducing agent toward the downstream side in the exhaust direction, for example, toward the catalyst reactor 11 (catalyst) arranged on the downstream side. For example, one injection device 13 may be provided at the center in the through direction of the through pipe 12, or a plurality of injection devices 13 may be provided at intervals in the through direction of the through pipe 12. In the present embodiment, since the injection device 13 is arranged in the straight pipe portion 10a of the exhaust pipe 10 and the catalyst reactor 11 is arranged at a downstream end of the straight pipe portion 10a, the injection device 13 is configured to inject the reducing agent toward the catalyst reactor 11, but the present invention is not limited to this embodiment. Alternatively, in an other example, the catalyst reactor 11 may be arranged in a bent pipe of the exhaust pipe 10 instead of the straight pipe portion 10a. To be specific, a bent pipe may be connected to the downstream end of the straight pipe portion 10a, and the catalyst reactor 11 may be connected to a downstream end of the bent pipe. In this case, the injection device 13 may be arranged in the straight pipe portion 10a, or may be arranged in the bent pipe. Namely, the reducing agent may be injected toward the downstream side of the inside of the exhaust pipe 10 in the exhaust direction.

The reducing agent supply device 14 is connected to the injection device 13 via a reducing agent supply pipe 16, sucks up the reducing agent stored in a reducing agent tank 17 by using a pump or the like, and supplies the reducing agent to the injection device 13 via the reducing agent supply pipe 16.

The cooling medium supply device 15 is connected to the injection device 13 via a cooling medium supply pipe 18, and supplies a cooling medium such as air supplied from an air supply section 19 to the injection device 13 via the cooling medium supply pipe 18. For example, the cooling medium supply device 15 may introduce air cooled by an intercooler (not illustrated) and supply the air as a cooling medium. Alternatively, the cooling medium supply device 15 may supply cooling water as the cooling medium instead of air.

As described above, according to the present invention, the exhaust purification apparatus 1 for purifying nitrogen oxides in exhaust gas includes the exhaust pipe 10 that causes exhaust gas discharged from the engine 100 to flow in a predetermined exhaust direction, the catalyst reactor 11 (catalyst) provided in the exhaust pipe 10 and reduces the nitrogen oxides in the exhaust gas, the through pipe 12 provided on the upstream side of the catalyst reactor 11 in the exhaust direction, in such a way as to penetrate the exhaust pipe 10 in a direction orthogonal to the exhaust direction, and the injection device 13 provided inside the through pipe 12 and injects a reducing agent for reducing exhaust gas into the exhaust pipe 10.

Thus, according to the exhaust purification apparatus 1 of the present invention, the injection device 13 that injects the reducing agent at the center position of the exhaust pipe 10 can be easily arranged and maintained by using the through pipe 12. Further, by using the through pipe 12, the reducing agent can be injected at the center position of the exhaust pipe 10 without inserting most of the injection device 13 into the exhaust pipe 10. Furthermore, by using the through pipe 12 with both ends penetrated, air permeability inside the through pipe 12 is improved, an influence of radiant heat from the wall surface of the through pipe 12 is suppressed, the inside of the through pipe 12 is suppressed from becoming a heat reservoir, cooling performance at the position of the injection device 13 can be improved, and thermal damage to the injection device 13 can be suppressed.

Further, in the exhaust purification apparatus 1 of the present invention, the injection device 13 is provided inside the through pipe 12 on the downstream side in the exhaust direction in such a way as to inject the reducing agent toward the catalyst reactor 11.

Thus, since the reducing agent can be injected into the exhaust gas flowing toward the catalyst reactor 11, stirring efficiency of the reducing agent can be improved, and generation of deposits can be suppressed.

Further, in the exhaust purification apparatus 1 of the present invention, the through pipe 12 has the planar portion 22a orthogonal to the exhaust direction on the downstream side in the exhaust direction, and the injection device 13 is provided on the planar portion 22a of the through pipe 12.

As a result, accuracy of the injection direction of the injection device 13 can be improved, the stirring efficiency of the reducing agent can be improved, and generation of deposits can be suppressed.

Further, in the exhaust purification apparatus 1 of the present invention, the through pipe 12 is provided in the straight pipe portion 10a formed in a linear shape in the exhaust pipe 10.

Thus, the reducing agent can be injected into the exhaust gas traveling straight toward the catalyst reactor 11, and therefore, the reducing agent can be prevented from adhering to the exhaust pipe 10 and the through pipe 12.

Further, in the exhaust purification apparatus 1 of the present invention, the through pipe 12 has the pair of side wall portions 20 extending in the exhaust direction and has a substantially elliptical cross-sectional shape elongated in the exhaust direction, and the pair of side wall portions 20 are formed to be curved in a streamlined shape, in such a way that the width of the cross-sectional shape decreases toward the downstream side in the exhaust direction.

Thus, the exhaust gas flowing on the outer peripheral surface side of the pair of side wall portions 20 can be suppressed from being separated from the pair of side wall portions 20, the exhaust gas can be caused to flow toward the center side in the width direction along the pair of side wall portions 20 without stagnation, and the exhaust gas can be caused to merge on the downstream side without forming a dead water region such as a vortex retention region. Therefore, regardless of penetration force of the injection device 13, the reducing agent injected from the injection device 13 can be efficiently mixed with the exhaust gas and supplied to the catalyst reactor 11.

In addition, in the exhaust purification apparatus 1 of the present invention, the through pipe 12 has the upstream side portion 21 having an arc-shaped cross section on the upstream side of the pair of side wall portions 20 in the exhaust direction, and the pair of side wall portions 20 is formed to be curved with a curvature smaller than that of the upstream side portion 21.

Thus, it is possible to improve the performance of causing the exhaust gas to flow toward the center side in the width direction along the pair of side wall portions 20 without stagnation.

Further, in the exhaust purification apparatus 1 of the present invention, the through pipe 12 is formed in such a way that the cross-sectional shape thereof is line symmetrical with respect to the central axis extending in the exhaust direction.

Thus, the flow of the exhaust gas on the outer peripheral surface side of the through pipe 12 can be made symmetrical inside the exhaust pipe 10, and the injected reducing agent can be prevented from flowing to the inner wall surface side of the exhaust pipe 10.

Figure 4:
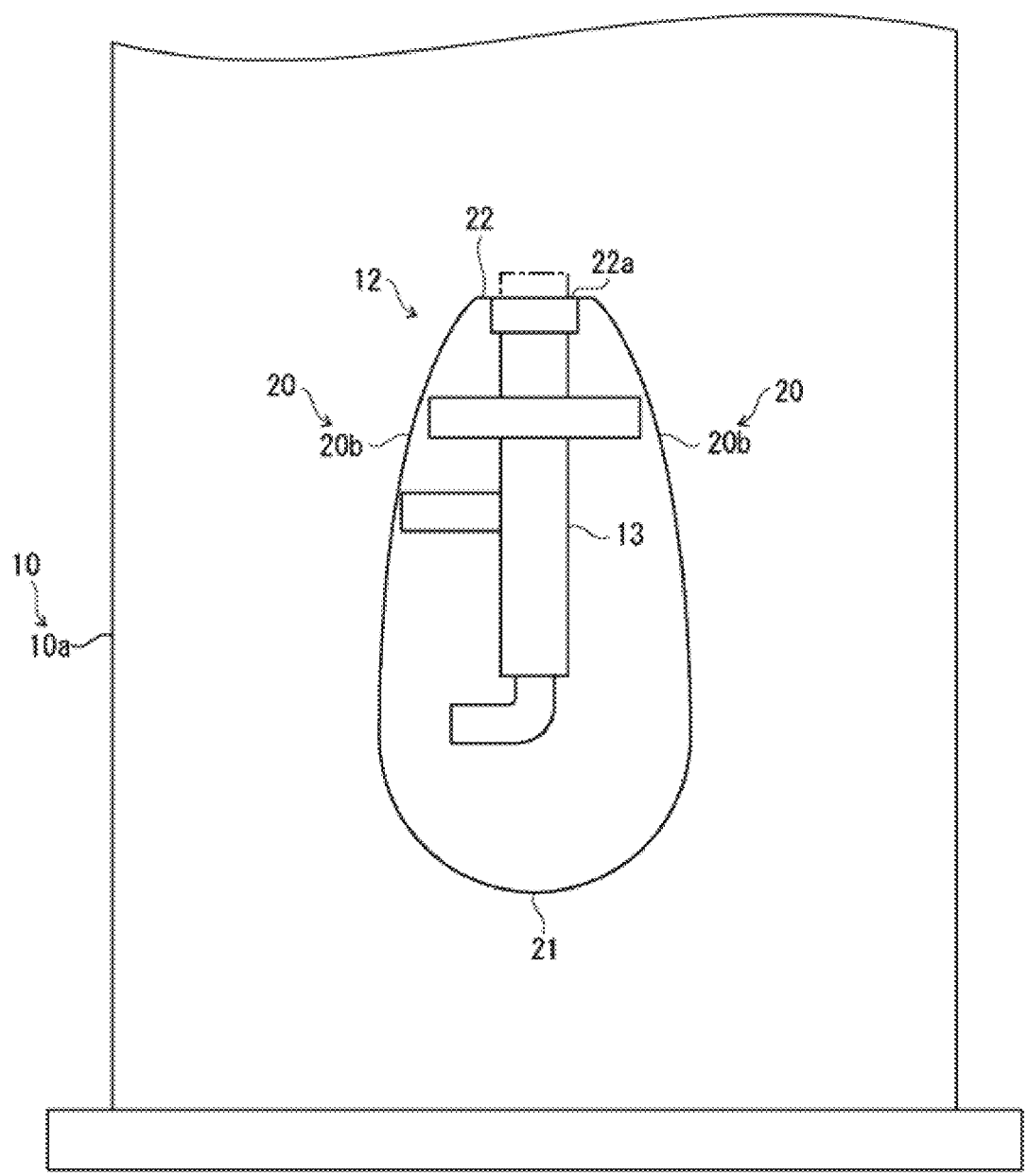
FIG. 4 is a front view illustrating an exhaust pipe and a through pipe in an exhaust purification apparatus according to an other example of the embodiment of the present invention.

In the above-described embodiment, the example in which the pair of side wall portions 20 constituting the streamlined shape of the side surface of the through pipe 12 has the linear portion 20a extending in the exhaust direction continuously from the end part of the upstream side portion 21 has been described, but the present invention is not limited to this example. In an other example, as illustrated in FIG. 4, the pair of side wall portions 20 may have a curved portion 20b constituting a streamlined shape, which is formed continuously from the end part of the upstream side portion 21, without having a linear portion 20a.

Figure 5:
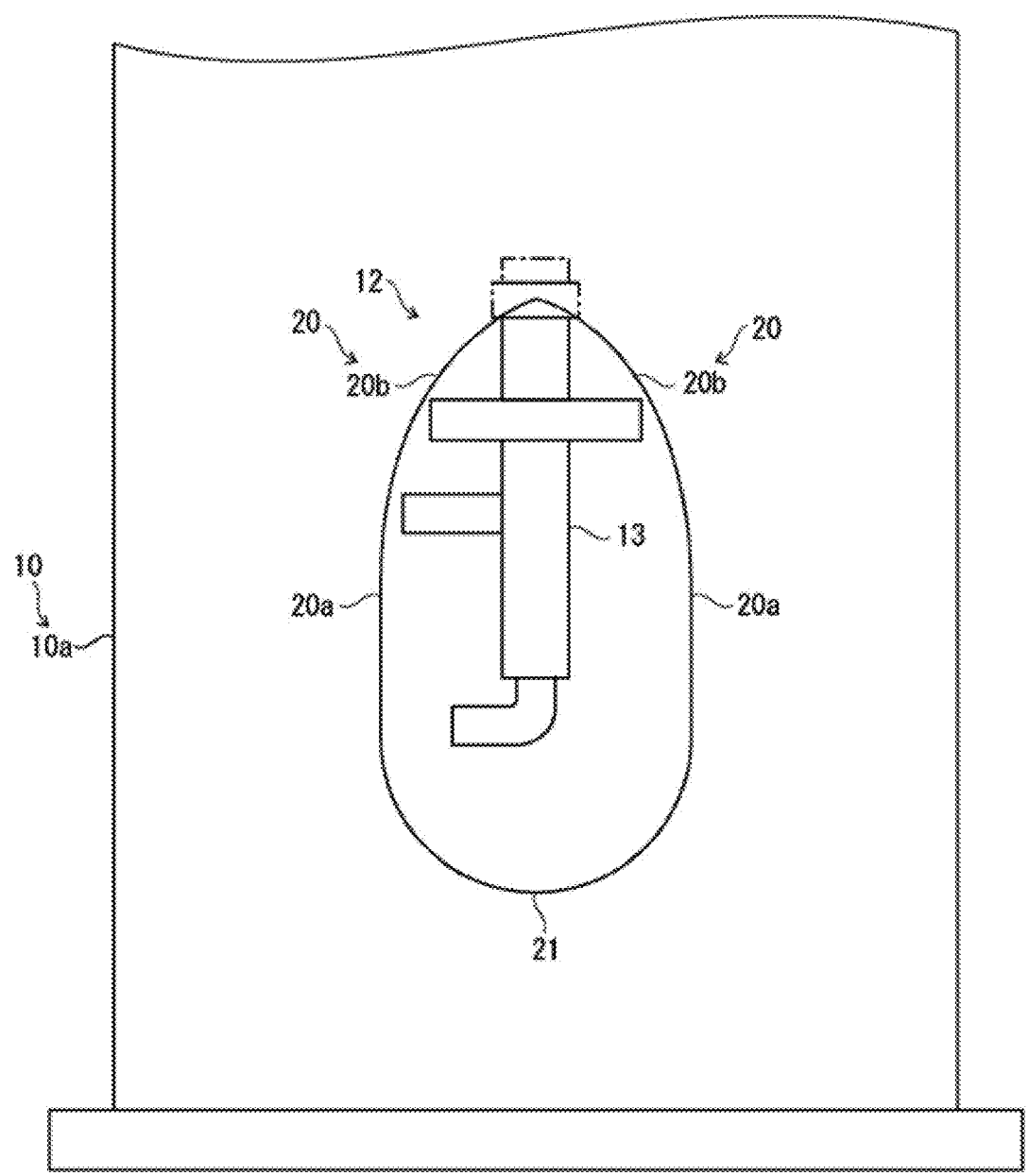
FIG. 5 is a front view illustrating an exhaust pipe and a through pipe in an exhaust purification apparatus according to an other example of the embodiment of the present invention.

Further, in the above-described embodiment, the example in which the through pipe 12 has the downstream side portion 22 including the planar portion 22a orthogonal to the exhaust direction has been described, but the present invention is not limited to this example. In an other example, as illustrated in FIG. 5, the through pipe 12 may have a pair of curved portions 20b joined at the center in the width direction, without having the downstream side portion 22. In this case, the injection device 13 may be provided at a joint between the pair of curved portions 20b.

Figure 6:
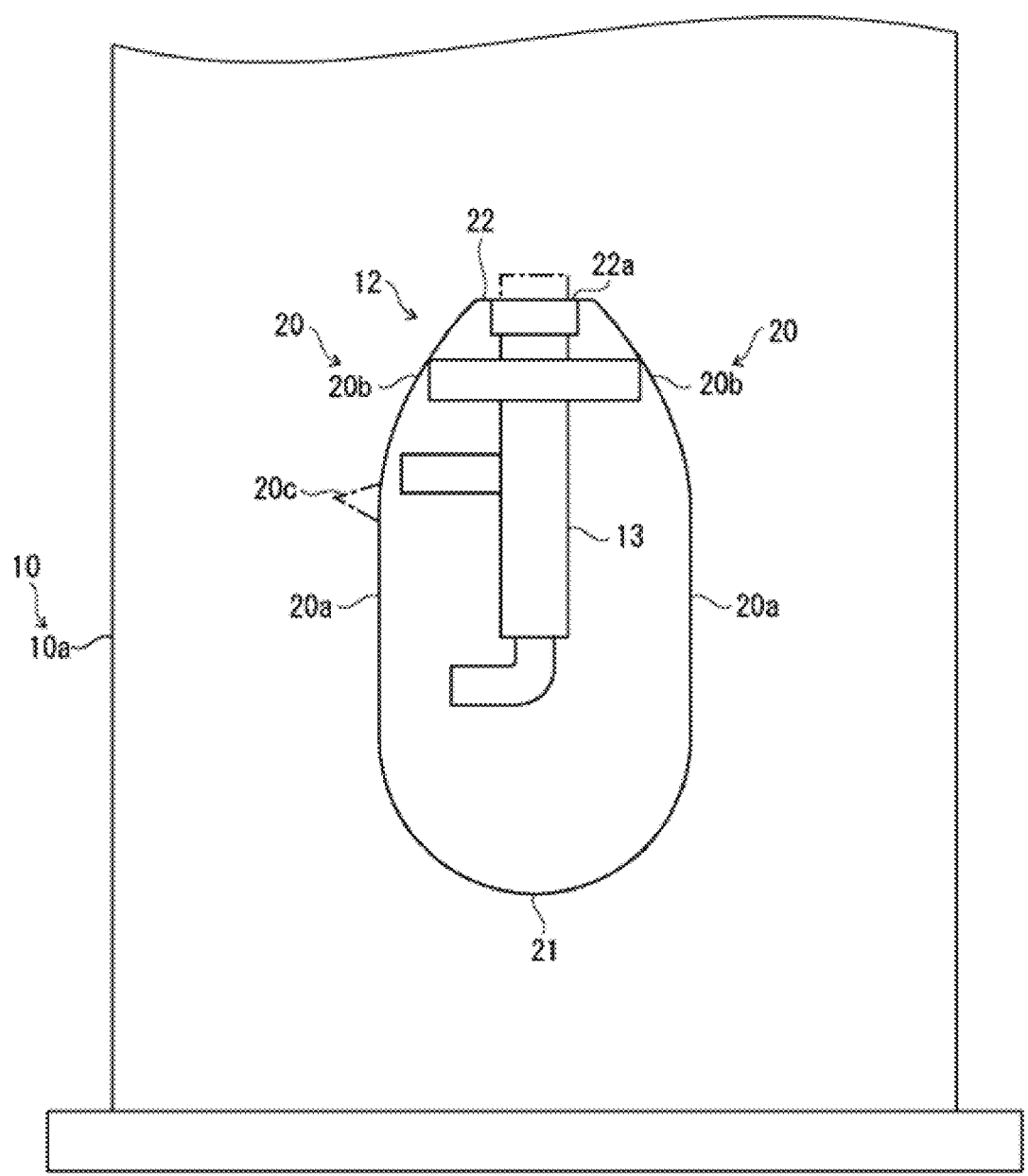
FIG. 6 is a front view illustrating an exhaust pipe and a through pipe in an exhaust purification apparatus according to an other embodiment of the present invention.

Further, in an other embodiment, as illustrated in FIG. 6, the through pipe 12 may include a protrusion 20c protruding outward in the width direction on at least one of the pair of side wall portions 20. The protrusion 20c acts as a vortex generator outside the side wall portion 20, and after the exhaust gas is separated from the side wall portion 20 by the protrusion 20c, the protrusion generates a vortex flow toward the downstream side in the exhaust direction and toward the center side in the width direction. The protrusion 20c is provided, for example, in a transition portion where the side wall portion 20 transitions from the linear portion 20a to the curved portion 20b. In this case, the side wall portion 20 provided with the protrusion 20c may not have a streamlined shape. One protrusion 20c may be provided at the center in the through direction, or a plurality of protrusions 20c may be provided at intervals in the through direction.

According to such an other embodiment, by generating a vortex acting on the exhaust gas flowing on the outer peripheral surface side of the side wall portion 20, the exhaust gas can be suppressed from being separated from the side wall portion 20, the exhaust gas can be caused to flow toward the center side in the width direction on the downstream side of the through pipe 12, and the exhaust gas can be caused to merge on the downstream side without forming a dead water region such as a vortex retention region. Therefore, regardless of penetration force of the injection device 13, the reducing agent injected from the injection device 13 can be efficiently mixed with the exhaust gas and supplied to the catalyst reactor 11.

Note that the present invention can be properly modified within a range which does not contradict to a gist or a concept of the present invention that can be read throughout the claims and the specification, and an exhaust purification apparatus involving such modifications is also included in the technical concept of the present invention.

Supplementary Notes

Hereinafter, the summary of the invention extracted from the above-described embodiments will be supplementarily noted. Configurations and processing functions to be described in the following supplementary notes may be selected and combined as appropriate.

Supplementary Note 1

An exhaust purification apparatus that purifies nitrogen oxides in exhaust gas, the exhaust purification apparatus including:
 an exhaust pipe that causes the exhaust gas discharged from an engine to flow;
 a catalyst that is provided in the exhaust pipe and that reduces the nitrogen oxides in the exhaust gas;
 a through pipe that is provided in such a way as to penetrate the exhaust pipe; and
 an injection device that is provided inside the through pipe and that injects a reducing agent that reduces the exhaust gas into the exhaust pipe.

Supplementary Note 2

The exhaust purification apparatus according to supplementary note 1, wherein the injection device is provided in such a way as to inject the reducing agent to a downstream side in the exhaust direction.

Supplementary Note 3

The exhaust purification apparatus according to supplementary note 1 or 2, wherein
 the through pipe has a planar portion on a downstream side in the exhaust direction, and
 the injection device is provided on the planar portion.

Supplementary Note 4

The exhaust purification apparatus according to any one of supplementary notes 1 to 3, wherein the through pipe is provided in a straight pipe portion formed in a linear shape in the exhaust pipe.

Supplementary Note 5

The exhaust purification apparatus according to any one of supplementary notes 1 to 4, wherein
 the through pipe includes a pair of side wall portions extending in the exhaust direction and has a substantially elliptical cross-sectional shape elongated in the exhaust direction, and
 the pair of side wall portions are formed in such a way that a width of the cross-sectional shape decreases toward a downstream side in the exhaust direction.

Supplementary Note 6

The exhaust purification apparatus according to supplementary note 5, wherein
 the through pipe includes an upstream side portion having an arc-shaped cross section on an upstream side of the pair of side wall portions, and
 the pair of side wall portions are formed to be curved with a curvature smaller than that of the upstream side portion.

Supplementary Note 7

The exhaust purification apparatus according to any one of supplementary notes 1 to 6, wherein the through pipe is formed in such a way that a cross-sectional shape thereof is line-symmetric with respect to a central axis extending in an exhaust direction.

REFERENCE SIGNS LIST 1 exhaust purification apparatus
10 exhaust pipe
10a straight pipe portion
11 catalyst reactor (catalyst)
12 through pipe
13 injection device
14 reducing agent supply device
15 cooling medium supply device
16 reducing agent supply pipe
17 reducing agent tank
18 cooling medium supply pipe
19 air supply section
20 side wall portion
20a linear portion
20b curved portion
20c protrusion
21 upstream side portion
22 downstream side portion
100 engine
101 exhaust port

The invention claimed is:

1. An exhaust purification apparatus that purifies nitrogen oxides in exhaust gas, the exhaust purification apparatus comprising:
 an exhaust pipe that causes the exhaust gas discharged from an engine to flow;
 a catalyst that is provided in the exhaust pipe and that reduces the nitrogen oxides in the exhaust gas;
 a through pipe, having both ends open, that is provided in such a way to pass through the exhaust pipe; and
 an injection device that is provided inside the through pipe and that injects a reducing agent, that reduces the exhaust gas, into the exhaust pipe,
 wherein the through pipe has a planar portion on a downstream side in an exhaust direction.

2. The exhaust purification apparatus according to claim 1, wherein the injection device is provided in such a way as to inject the reducing agent to a downstream side in an exhaust direction.

3. The exhaust purification apparatus according to claim 1, wherein
 the injection device is provided on the planar portion.

4. The exhaust purification apparatus according to claim 1, wherein the exhaust pipe has a straight pipe portion formed in a linear shape, the through pipe is provided in the straight pipe portion.

5. The exhaust purification apparatus according to claim 1, wherein
 the through pipe has a pair of side wall portions extending in an exhaust direction, and has a substantially elliptical cross-sectional shape elongated in the exhaust direction, and
 the pair of side wall portions is formed in such a way that a width of the cross-sectional shape decreases toward a downstream side in the exhaust direction.

6. The exhaust purification apparatus according to claim 5, wherein
 the through pipe has an upstream side portion having an arc-shaped cross section on an upstream side of the pair of side wall portions, and
 the pair of side wall portions is formed to be curved with a less tight curvature than that of the upstream side portion.

7. The exhaust purification apparatus according to claim 1, wherein the through pipe is formed in such a way that a cross-sectional shape thereof is line-symmetrical with respect to a central axis extending in an exhaust direction.

8. The exhaust purification apparatus according to claim 1, the injection device injects the reducing agent into the exhaust pipe downstream of the through pipe.

9. An exhaust purification apparatus that purifies nitrogen oxides in exhaust gas, the exhaust purification apparatus comprising:
 an exhaust pipe that causes the exhaust gas discharged from an engine to flow;
 a catalyst that is provided in the exhaust pipe and that reduces the nitrogen oxides in the exhaust gas;
 a through pipe, having both ends open, that is provided in such a way to pass through the exhaust pipe; and
 an injection device that is provided inside the through pipe and that injects a reducing agent, that reduces the exhaust gas, into the exhaust pipe,
 wherein the through pipe has an upstream side portion having an arc-shaped cross section on an upstream side.

* * * * *